(12) United States Patent
Sanchez Rola et al.

(10) Patent No.: US 12,346,922 B1
(45) Date of Patent: *Jul. 1, 2025

(54) PROTECTING AGAINST AN ESTIMATED LEVEL OF ONLINE TRACKING

(71) Applicant: Gen Digital Inc., Tempe, AZ (US)

(72) Inventors: Iskander Sanchez Rola, Antibes (FR); Petros Efstathopoulos, Los Angeles, CA (US)

(73) Assignee: GEN DIGITAL INC., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,641

(22) Filed: Mar. 28, 2024

Related U.S. Application Data

(63) Continuation of application No. 17/703,599, filed on Mar. 24, 2022, now Pat. No. 12,014,386.

(51) Int. Cl.
| | |
|---|---|
| *G06Q 30/0204* | (2023.01) |
| *G06Q 30/0203* | (2023.01) |
| *H04L 9/40* | (2022.01) |
| *H04L 67/50* | (2022.01) |

(52) U.S. Cl.
CPC ..... *G06Q 30/0205* (2013.01); *G06Q 30/0203* (2013.01); *H04L 63/1441* (2013.01); *H04L 67/535* (2022.05); *G06F 2221/2119* (2013.01); *H04L 63/10* (2013.01)

(58) Field of Classification Search
CPC ............ G06Q 30/0205; G06Q 30/0203; H04L 63/1441; H04L 63/10; G06F 2221/2119
See application file for complete search history.

(56) References Cited

U.S. PATENT DOCUMENTS

| | | | |
|---|---|---|---|
| 6,839,680 B1* | 1/2005 | Liu | G06Q 30/02 705/7.33 |
| 9,904,738 B2 | 2/2018 | Wang | |
| 10,110,633 B2 | 10/2018 | Laoutaris | |
| 11,449,637 B1 | 9/2022 | Sanchez Rola | |
| 11,849,002 B1* | 12/2023 | Sanchez Rola | H04L 63/1433 |
| 2022/0222378 A1 | 7/2022 | Johannsen | |

OTHER PUBLICATIONS

NORTON; "Security > Privacy > Internet tracking: How and why we're followed online"; webpage; located at: https://us.norton.com/internetsecurity-privacy-internet-tracking.html; accessed on Mar. 24, 2022; 9 pages.

* cited by examiner

*Primary Examiner* — Bryan Y Lee
(74) *Attorney, Agent, or Firm* — MASCHOFF BRENNAN

(57) ABSTRACT

Systems and methods for protecting against an estimated level of online tracking are disclosed. In one embodiment, a method may include collecting data relating to a plurality of known users. This first data may include browser histories and a level of online tracking for each known user. The known users may be organized into clusters and second data relating to an unknown user may be received. The second data may include an identification of one or more categories of websites that the unknown user visits, and one or more websites within each of the one or more categories of websites that the unknown user visits. A matching cluster for the unknown user may be identified and levels of online tracking for similar known users within the matching cluster may be used to estimate a level of online tracking for the unknown user.

20 Claims, 4 Drawing Sheets

PROTECTING AGAINST AN ESTIMATED LEVEL OF ONLINE TRACKING

CROSS REFERENCE TO RELATED APPLICATION

This application is a continuation of U.S. patent application Ser. No. 17/703,599, filed on Mar. 24, 2022, which is incorporated herein by reference in its entirety.

BACKGROUND

Many websites that are accessible on the Internet today include one or more tracking domains. These tracking domains can compromise the privacy of any user that happens to visit these websites or select (e.g., click on or tap on) a link that is associated with a tracking domain. The levels of tracking activities occurring to individual users may differ significantly depending on the types of websites that the users visit and the links they select.

Tracking domains often perform their privacy invasive actions in the background and without the knowledge of the user. This makes it difficult for Internet users to understand and appreciate the level of online tracking occurring and the scope of the privacy violations that are being committed by these tracking domains.

To help users understand the level of online tracking that is taking place, a personalized tracking analysis may be performed. Performing this personalized tracking analysis, however, requires that the user install some additional software to his or her device. Some users may not be interested in acquiring the necessary software to perform a personalized tracking analysis. These users, therefore, may be completely unaware of the level of online tracking, and the privacy violations, occurring to them.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for protecting against an estimated level of online tracking may be performed, at least in part, by a computing device that includes one or more processors. The method may include collecting first data relating to a plurality of known users, wherein the plurality of known users is associated with a plurality of accessible user devices and wherein the first data includes an identification of at least one of: (1) a geographical location of each known user, (2) one or more websites visited by each known user on the plurality of accessible user devices, and (3) a level of online tracking for each known user on the plurality of accessible user devices. The method may also include organizing the known users into clusters by identifying website categories from the one or more websites visited by the known users on the plurality of accessible user devices and placing the known users into clusters based on their most visited website categories and/or their geographic locations. The method may also include receiving second data relating to an unknown user, the second data including an identification of at least one of: (1) a geographic location of the unknown user, (2) one or more categories of websites that the unknown user visits, and (3) one or more websites within each of the one or more categories of websites that the unknown user visits. The method may also include identifying, based on the second data, a matching cluster into which the unknown user fits and estimating, based on the identified levels of online tracking for one or more known users within the matching cluster, a level of online tracking for the unknown user. The method may finally include performing a security action based on the estimated level of online tracking for the unknown user.

In some embodiments, each cluster within the one or more clusters may include one or more graphs and trees, which can be constructed based on the most accessed websites by the known users within each website category.

In some embodiments, the geographic location of the unknown user may be extracted from a device that is associated with the unknown user.

In some embodiments, the one or more categories of websites that the unknown user visits and the one or more websites within each of the one or more categories of websites that the unknown user visits may be provided by the unknown user in response to a questionnaire that requests this information. In these embodiments, the questionnaire may provide a list of categories of websites and the unknown user may be instructed to select the categories of websites that the unknown user most often visits. In these embodiments, the questionnaire may provide a first list of websites within a category selected by the unknown user, the first list of websites may be personalized for the unknown user based on the geographic location of the unknown user, and the unknown user may be instructed to select the websites in the first list that the unknown user has visited within an identified period of time. Further, in these embodiments, the questionnaire may provide a second list of websites within a category selected by the unknown user, the second list of websites may be personalized for the unknown user based on the websites selected from the first list of websites and the geographic location of the unknown user, and the unknown user may be instructed to select the websites in the second list that the unknown user has visited within an identified period of time.

In some embodiments, the estimated level of online tracking for the unknown user may include at least one of an estimated number of trackers following the unknown user, the identity of the trackers likely following the unknown user, or a type of tracking activity likely to be occurring.

In some embodiments, the security action may include identifying to the unknown user the estimated level of online tracking and/or identifying a solution to reduce the estimated level of online tracking.

In some embodiments, one or more non-transitory computer-readable media may comprise one or more computer-readable instructions that, when executed by one or more processors of a computing device, cause the computing device to perform a method for protecting against an estimated level of online tracking.

In some embodiments, a computing device comprising one or more processors and one or more non-transitory computer-readable media comprising one or more computer-readable instructions that, when executed by the one or more processors, may cause the computing device to perform a method for protecting against an estimated level of online tracking.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
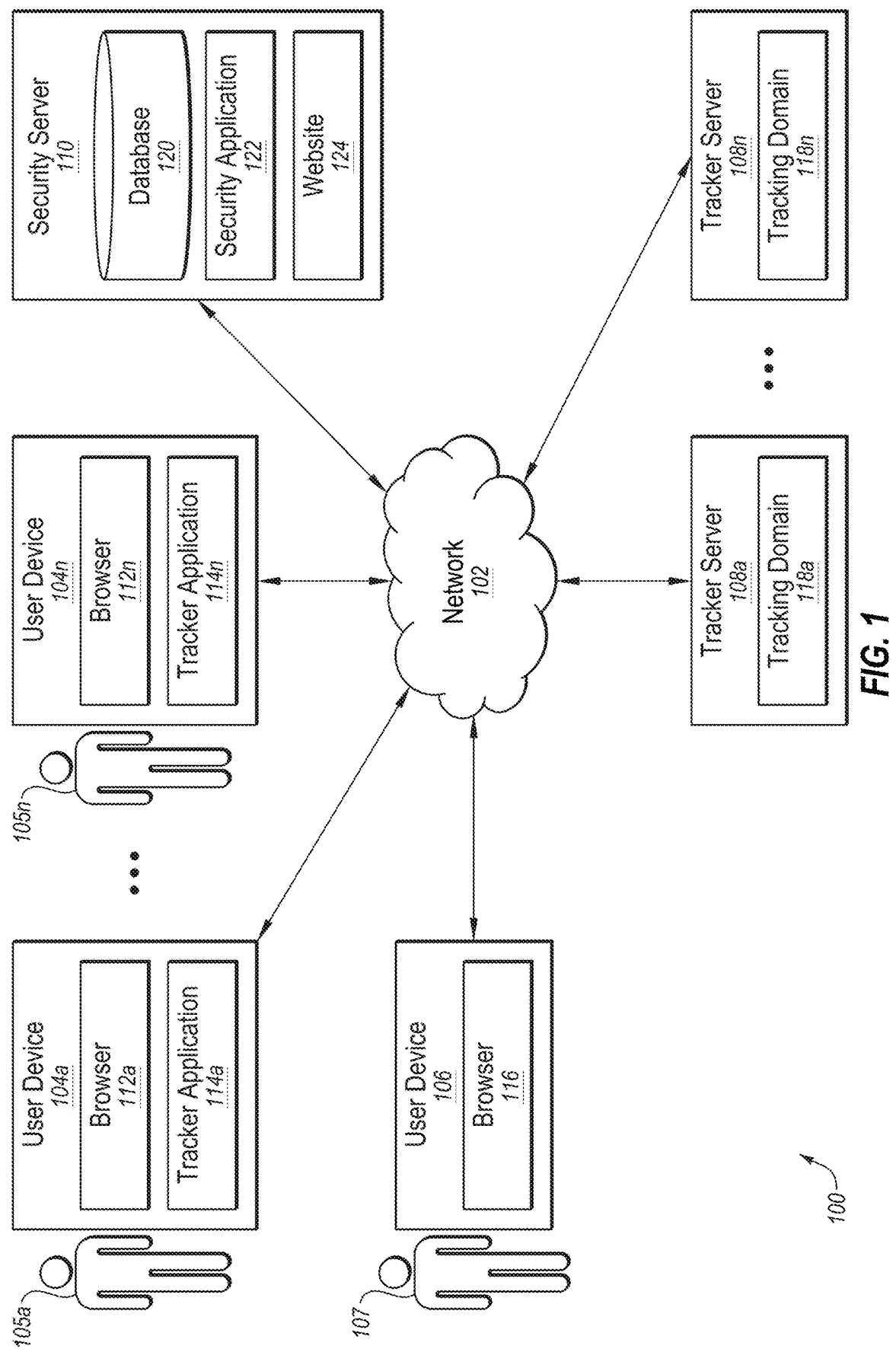
FIG. 1 illustrates an example system configured for protecting against an estimated level of online tracking.

Many websites that are accessible on the Internet today include one or more tracking domains. These tracking domains can compromise the privacy of any user that happens to visit these websites or select (e.g., click on or tap on) a link that is associated with a tracking domain. The levels of tracking activities occurring to individual users may differ significantly depending on the types of websites that the users visit and the links they select.

Tracking domains often perform their privacy invasive actions in the background and without the knowledge of the user. This makes it difficult for Internet users to understand and appreciate the level of online tracking occurring and the scope of the privacy violations that are being committed by these tracking domains.

To help users understand the level of online tracking that is taking place, a personalized tracking analysis may be performed. Performing this personalized tracking analysis, however, requires that the user install some additional software on his or her device. For example, the user may be required to install a browser extension and grant permission to check the user's browser information, or download an executable that allows the user's browser history file to be checked.

Some users may not be interested in acquiring the necessary software to perform a personalized tracking analysis. These users, therefore, may be completely unaware of the level of online tracking, and privacy violations, occurring to them.

Some embodiments disclosed herein may enable protecting against an estimated level of online tracking. In particular, some embodiments may collect first data relating to a plurality of known users. The plurality of known users may be associated with a plurality of accessible user devices. This first data may include an identification of: (1) a geographical location of each known user, (2) one or more websites visited by each known user on the plurality of accessible user devices, and (3) a level of online tracking for each known user on the plurality of accessible user devices. The known users may be organized into clusters by identifying website categories from the one or more websites visited by the known users on the plurality of accessible user devices and placing the known users into clusters based on their most visited website categories and their geographic locations. Second data relating to an unknown user may be received. The second data may include an identification of: (1) a geographic location of the unknown user, (2) one or more categories of websites that the unknown user visits, and (3) one or more websites within each of the one or more categories of websites that the unknown user visits. Based on the second data, a matching cluster into which the unknown user fits may be identified. Based the identified levels of online tracking for each known user within the matching cluster, a level of online tracking for the unknown user may be estimated. A security action may then be performed based on the estimated level of online tracking for the unknown user.

Turning to the figures, FIG. 1 illustrates an example system 100 configured for protecting against an estimated level of online tracking. The system 100 may include a network 102, user devices 104a-104n and associated users 105a-105n, a user device 106 and associated user 107, tracker servers 108a-108n, and a security server 110.

In some embodiments, the network 102 may be configured to communicatively couple the user devices 104a-104n, the user device 106, the tracker servers 108a-108n, and the security server 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
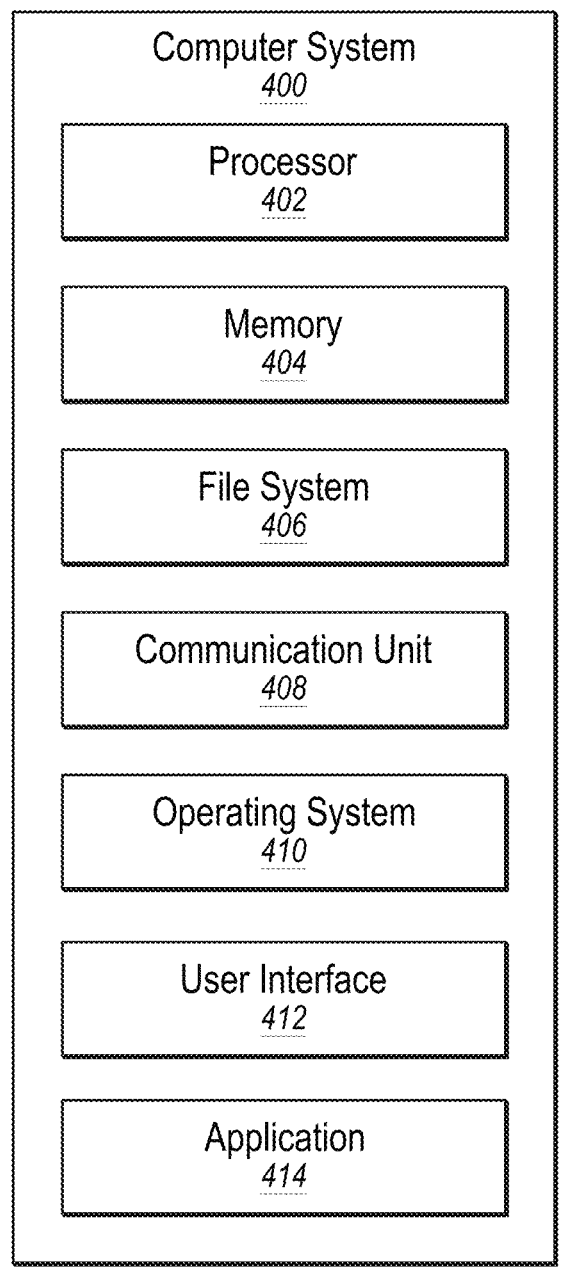
FIG. 4 illustrates an example computer system that may be employed in protecting against an estimated level of online tracking.

In some embodiments, the user devices 104a-104n may be any computer systems capable of communicating over the network 102, examples of which are disclosed herein in connection with the computer system 400 of FIG. 4. In some embodiments, the user devices 104a-104n may include web browsers 112a-112n. The web browsers 112a-112n may enable the users 105a-105n to access third party content, such as websites, over the network 102. The user devices 104a-104n may also include tracker applications 114a-114n. The tracker applications 114a-114n could be configured in a variety of different ways. For example, the tracker applications 114a-114n could be configured as extensions or plugins or addons to the web browsers 112a-112n. Alternatively, the tracker applications 114a-114n may be another type of executable file or software product. Regardless of how the tracker applications 114a-114n are configured, the tracker applications 114a-114n may interface with the security server 110 to allow the security server 110 to access browsing histories on browsers 112a-112n for each of the users 105a-105n on the user devices 104a-104n.

In some embodiments, the user device 106 may be any computer system capable of communicating over the network 102, examples of which are disclosed herein in connection with the computer system 400 of FIG. 4. In some embodiments, the user device 106 may include a web browser 116. The web browser 116 may enable the user 107 to access third party content, such as websites, over the network 102.

In some embodiments, the tracker servers 108a-108n may be any computer systems capable of communicating over the network 102, examples of which are disclosed herein in connection with the computer system 400 of FIG. 4. In some embodiments, the tracker servers 108a-108n may include tracking domains 118a-118n. The tracking domains 118a-118n may be configured to perform tracking activities on one or more of the users 105a-105n and 107 through their respective web browsers 112a-112n and 116.

In some embodiments, the security server 110 may be any computer system capable of communicating over the network 102, examples of which are disclosed herein in connection with the computer system 400 of FIG. 4. In some embodiments, the security server may include a database 120, a security application 122, and a website 124. The security application 122 may be configured to communicate with the tracker applications 114*a*-114*n* to gather data relating to the users 105*a*-105*n*. For example, the security application 122 may be configured to collect a geographical location for each of users 105*a*-105*n*, the browser histories of the browsers 112*a*-112*n* including the websites visited by the users 105*a*-105*n* through the browsers 112*a*-112*n*, and a level of online tracking for each of the users 105*a*-105*n*. This level of online tracking may include a number of trackers following each of the users 105*a*-105*n*, an identification of the trackers following the users 105*a*-105*n*, and a type of tracking activity that these trackers are performing on the users 105*a*-105*n*. Once received, this data may be stored in the database 120.

In one embodiment, the security application may organize the users 105*a*-105*n* into clusters based on their geographical locations and the categories of websites that they most often visit. These clusters may include one or more graphs and trees that are constructed based on the websites most frequently accessed by the users 105*a*-105*n* within each category of websites.

The security application 122 may also be configured to receive data from the user 107 through the user device 106. In one embodiment, the security application 122 may receive this data from the user 107 by presenting the user 107 with a questionnaire. This questionnaire may be presented on the website 124, which the user 107 may access using the browser 116. The security application 122 may identify a geographic location for the user 107. In one embodiment, the geographic location of the user 107 may be identified by extracting this information from the user device 106. Alternatively, this information may be provided by the user 107 in response to a question seeking this information in the questionnaire.

In some embodiments, the questionnaire may ask the user 107 to identify one or more categories of websites that the user 107 visits. The questionnaire may also ask the user 107 to identify one or more websites within each category of websites identified that the user 107 has visited in a stated period of time. For example, the user 107 may be asked to identify websites that the user 107 has visited in the previous day, week, month or some other time period. Alternatively, the user 107 may simply be asked to identify the websites that the user 107 visits most frequently over a given period of time, such as the last month or year or another time period.

Once the security application 122 is in possession of this information from the user 107, it may identify, based on this data, a matching cluster into which the unknown user fits. The security application 122 may further identify one or more known users within the matching cluster that are most similar to the unknown user. A level of online tracking for the user 107 may then be estimated by the security application 122 based on the identified levels of online tracking for the one or more known users in the matching cluster that are most similar to the unknown user. The security application 122 may be configured to then perform a security action based on the estimated level of online tracking for the user 107. In some embodiments, the security application 122 may be part of NortonLifeLock's Anti-Tracking product.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, a separate server may host the website 124, which transmits data collected from the unknown user 107 to the security application 122. Alternatively, the information received from the user 107 may be received in response to an email or another form of communication with the user 107.

Figure 2:
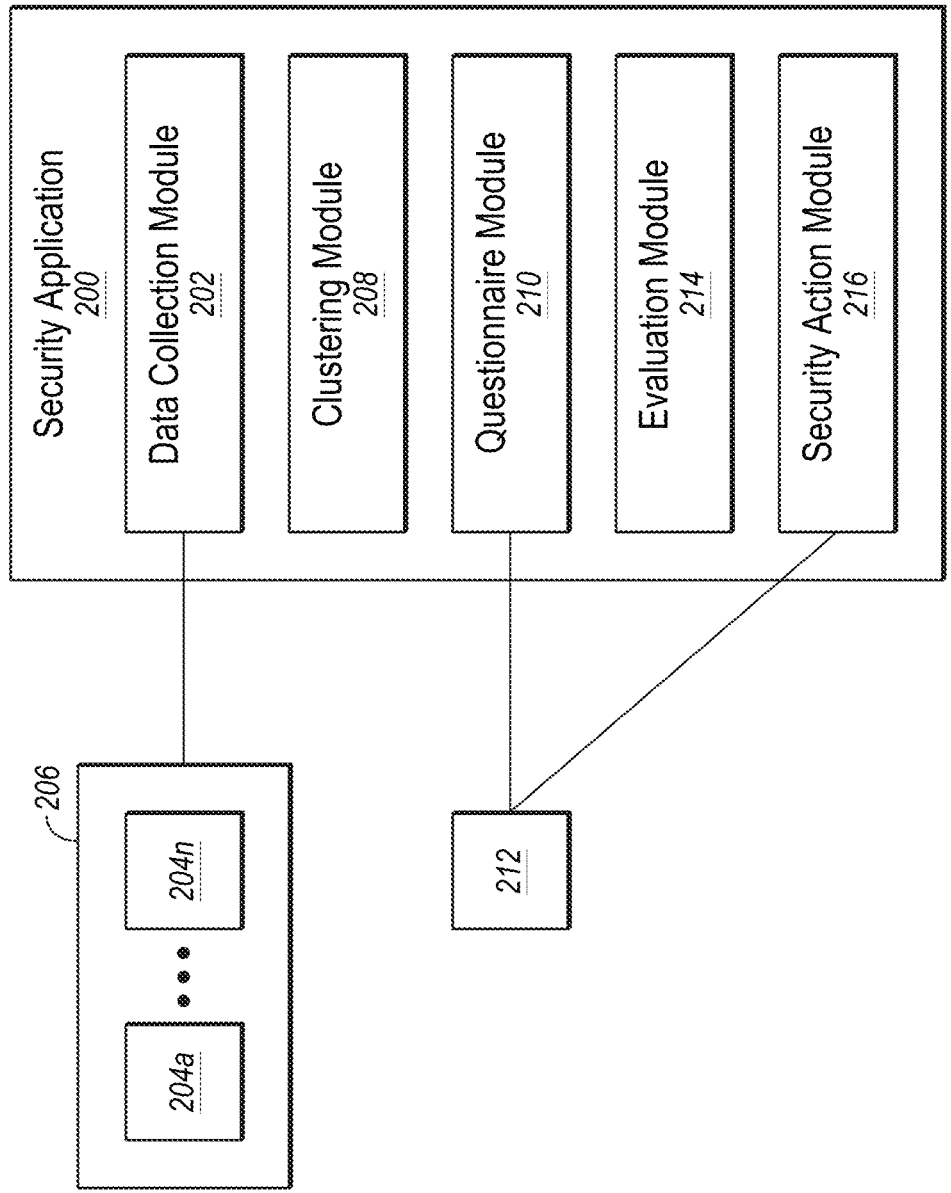
FIG. 2 illustrates an exemplary security application.

FIG. 2 illustrates an exemplary security application 200. As disclosed in FIG. 2, the security application 200 may include a data collection module 202, a clustering module 208, a questionnaire module 210, an evaluation module 214, and a security action module 216. In one embodiment, the data collection module 202 may be configured to collect data from a known group of users 206 through known devices 204*a*-204*n*, which are associated with one or more of the users within the known group of users 206.

These known devices 204*a*-204*n* may have software installed that allows the data collection module to access certain data that is stored within the known devices 204*a*-204*n*. For example, the known devices 204*a*-204*n* may have extensions, plugins, or addons to their web browsers or another type of executable file installed that allows the data collection module 202 to obtain a geographic location for the known devices 204*a*-204*n* (or their associated users), one or more websites visited on the known devices 204*a*-204*n*, and a level of online tracking for each known user associated with the known devices 204*a*-204*n*. The level of online tracking for each known user associated with the known devices 204*a*-204*n* may include a number of trackers following each individual within the known group of users 206, an identification of the trackers following each individual within the known group of users 206, and a type of tracking activity that these trackers are performing on each individual within the known group of users 206.

In one embodiment, the clustering module 208 may be configured to cluster the known users within the group 206 into one or more clusters. These clusters may be based on the known users' geographic locations and one or more categories of websites that the known users visit, which may be determined based on an inspection of the actual websites that the known users visit. The clusters created by the clustering module 208 may include one or more graphs and trees, which the clustering module 208 may create based on the websites that are most frequently accessed by the known users within the group 206.

In one embodiment, the questionnaire module 210 may be configured to generate a questionnaire that elicits information from an unknown user, such as the unknown user 212. The questionnaire module 210 may ask for the geographic location of the unknown user 212. Alternatively, the security application 200 may extract the geographic location of the unknown user 212 from a device that is associated with the unknown user 212. The questionnaire module 210 may also ask the unknown user 212 to identify one or more categories of websites that the unknown user 212 visits. These categories may be presented to the unknown user 212 in a list of the most popular website categories. For example, business, technology/Internet, shopping, education, entertainment, travel, news, etc. may be presented as website categories from which the unknown user 212 can choose.

Once the unknown user 212 has selected one or more website categories, a first set of specific websites from a selected category may be presented to the unknown user 212. The unknown user 212 may be asked to identify the websites that the user has visited within a stated period of time, such as the prior day, week, month, or more. The first set of specific websites that are presented to the unknown user 212 may be dynamically personalized for the user based on information already received from the unknown user 212. For example, the first set of specific websites may be narrowed based on the geographic location of the unknown user 212 and the categories of websites that the unknown user 212 has selected. In one embodiment, if the unknown user 212 is in San Diego and has selected "news" as a category that the user frequently visits, the questionnaire module 210 may include in the first set of specific websites the most popular local (San Diego) news websites.

After the unknown user 212 has selected one or more website from the first set of specific websites, a second set of specific websites from the selected categories may be presented to the unknown user 212. The unknown user 212 may again be asked to identify the websites that the user has visited within a stated period of time, such as the prior day, week, month, or more. The second set of specific websites that are presented to the unknown user 212 may be further dynamically personalized for the user based on the geographic location of the unknown user 212, the other categories of websites that the unknown user 212 has selected, and the websites selected from the first set of specific websites. This process may be repeated as necessary in order to identify a group of websites that the unknown user 212 visits in each of the website categories that the unknown user 212 selects.

In one embodiment, the evaluation module 214 may be configured to evaluate the data collected from the unknown user 212. The evaluation module 214 may identify a matching cluster into which the unknown user most appropriately fits. Once a matching cluster is identified, the evaluation module 214 may further identify, based on the specific websites that the unknown user 212 identifies and his or her geographic location, one or more known users within the matching cluster that are most similar to the unknown user 212. The number of known users that are most similar to the unknown user 212 may vary widely depending on the data provided by the unknown user 212. For example, the evaluation module 214 may identify a single known user that is most similar to the unknown user 212. Alternatively, the evaluation module 214 may identify hundreds or thousands or more known users that are most similar to the unknown user 212.

Once the one or more known users that are most similar to the unknown user 212 are identified, the evaluation module 214 may estimate a level of online tracking for the unknown user 212. This estimated level of online tracking may include an estimated number of trackers following the unknown user 212, an identification of the trackers likely following the unknown user 212, and a type of tracking activity that these trackers are likely performing on the user 212. In one embodiment, where there is a plurality of known users identified as most similar to the unknown user 212, the evaluation module 214 may identify an average of the online tracking levels of the plurality of known users for the unknown user 212.

Alternatively, the evaluation module 214 may rank the plurality of known users identified as most similar to the unknown user 212 from highest to lowest similarity. The tracking levels for these known users may be weighted based on how similar they are to the unknown user 212 so that the levels of tracking of the known users that are most similar to the unknown user 212 are weighted more heavily than the levels of tracking of the known users that are less similar to the unknown user 212. Once weighted properly, the evaluation module 214 may calculate an estimated level of online tracking for the unknown user 212.

In one embodiment, the security action module 216 may be configured to identify and perform a security action. The security action identified and performed may depend on the level of online tracking estimated for the unknown user 212. For example, the security action module 216 may identify to the unknown user 212 the estimated level of online tracking occurring. In other embodiments, the security action may include identifying a solution to the unknown user 212 to reduce the estimated level of online tracking. For example, the security action may recommend avoiding certain websites, disabling cookies tracking, or using a VPN to browse the Internet. Alternatively, the security action may identify a product, such as an ad blocker or tracker blocker, that would reduce the level of online tracking estimated for the unknown user 212.

The security application 200 is thus able to provide the unknown user 212 with an estimated level of online tracking without requiring the unknown user 212 to install any additional software onto his or her device. The unknown user 212 is simply required to provide information to the security application 200 in order for this estimated level of online tracking to be determined. By receiving this estimation of the level of online tracking occurring to the unknown user 212, he or she may appreciate the severity of the problem and take the necessary steps to protect his or her privacy.

Modifications, additions, or omissions may be made to the security application 200 without departing from the scope of the present disclosure. For example, the security application 200 may include additional components similar to the components illustrated in FIG. 2 that each may be configured similarly to the components illustrated in FIG. 2.

Figure 3:
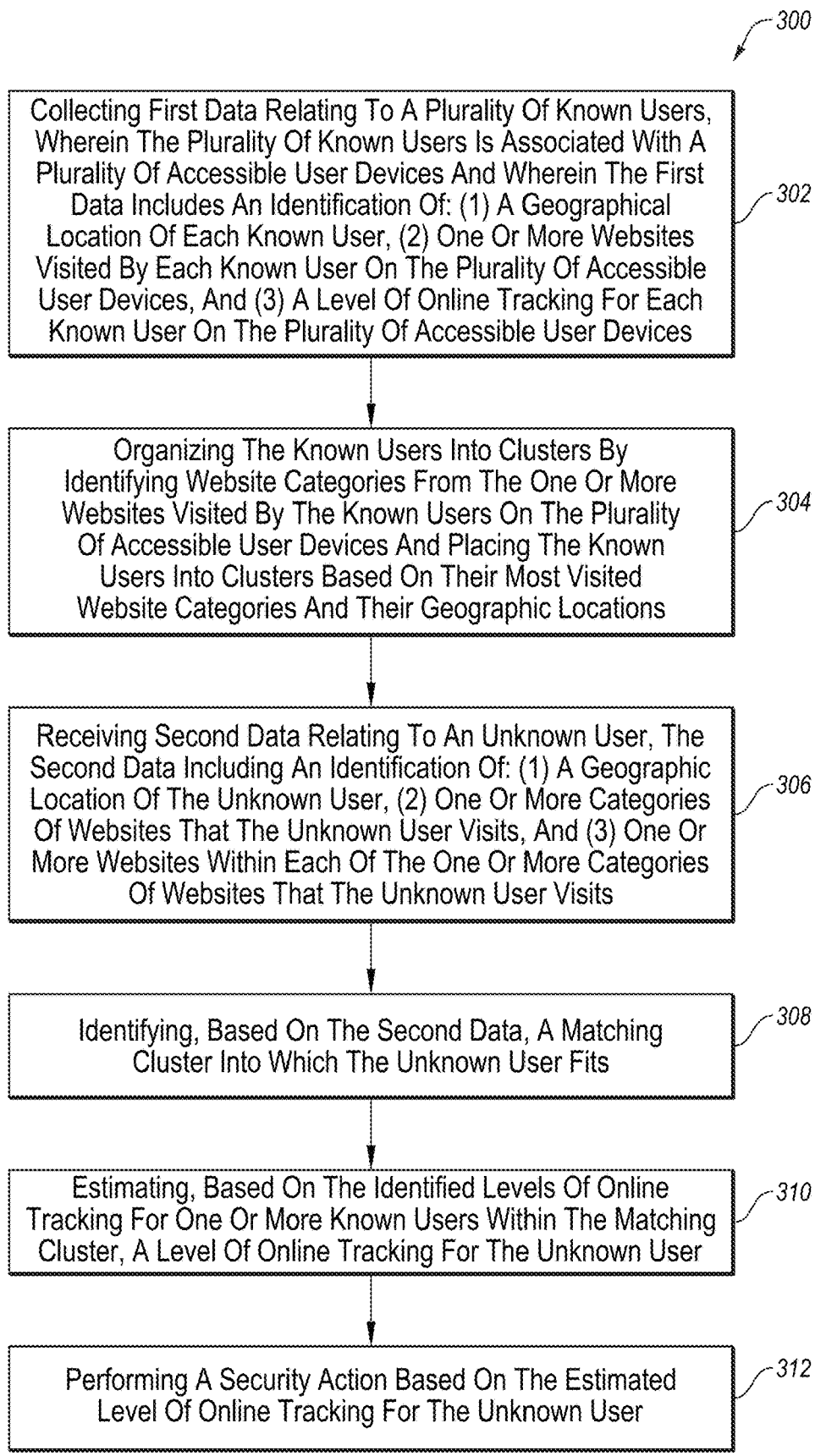
FIG. 3 is a flowchart of an example method for protecting against an estimated level of online tracking.

FIG. 3 is a flowchart of an example method for protecting against an estimated level of online tracking. The method 300 may be performed, in some embodiments, by a device or system, such as by the security application 122 of FIG. 1 or the security application 200 of FIG. 2. In these and other embodiments, the method 300 may be performed by one or more processors based on one or more computer-readable instructions stored on one or more non-transitory computer-readable media.

The method 300 may include, at action 302, collecting first data relating to a plurality of known users, wherein the plurality of known users is associated with a plurality of accessible user devices and wherein the first data includes an identification of: (1) a geographical location of each known user, (2) one or more websites visited by each known user on the plurality of accessible user devices, and (3) a level of online tracking for each known user on the plurality of accessible user devices. The plurality of accessible user devices may have software installed that allows the geographic location and the browser histories on these devices to be accessed. The first data may be collected by any number of known users and accessible user devices. In one embodiment, the first data may be collected from several hundred to many thousands of known users.

In one embodiment, the level of online tracking for each known user on the plurality of accessible user devices may include a number of trackers following each known user. The level of online tracking may also include the identity of the entities tracking each known user. The level of online tracking may also include a type of tracking that these tracking entities are conducting on each user. For example, the type of tracking activity may include a ghost creator, a third-party creator, an intermediate creator, an own sender, an in-chain sender, an off-chain sender, an own receiver, an own self-receiver, an in-chain receiver, an in-chain self-receiver, an off-chain receiver, an off-chain self-receiver, an intermediate sharer, or another type of tracking activity. A tracking score may also be assigned to each tracking entity based on the tracking techniques they use and the severity of the privacy violations they commit. These tracking scores for each tracking entity may also be included within the level of online tracking for each known user.

The method 300 may include, at action 304, organizing the known users into clusters by identifying website categories from the one or more websites visited by the known users on the plurality of accessible user devices and placing the known users into clusters based on their most visited website categories and their geographic locations. In one embodiment, the known users may first be divided into groups based on their geographic locations. For example, the known users may be divided into groups based on the cities, states, countries, etc. in which they reside. Once separated by geography, the known users may be clustered based on the website categories that they visit most often. These website categories may include business, technology/Internet, shopping, education, entertainment, travel, news, etc. Trees and graphs may be constructed for each known user within each cluster based on the most accessed websites by the known users within each website category.

The method 300 may include, at action 306, receiving second data relating to an unknown user, the second data including an identification of: (1) a geographic location of the unknown user, (2) one or more categories of websites that the unknown user visits, and (3) one or more websites within each of the one or more categories of websites that the unknown user visits. In one embodiment, the geographic location of the unknown user may be extracted from a device that is associated with the unknown user. Alternatively, the geographical location of the unknown user may be identified by the unknown user in response to a request for this information.

The unknown user may also identify website categories and specific websites visited in response to questions presented to the unknown user in a questionnaire. For example, a list of the most popular website categories may be presented to the unknown user. These website categories may include business, technology/Internet, shopping, education, entertainment, travel, news, etc. The unknown user may select one or more of the categories presented.

In response to the unknown user's selection of one or more categories of websites, specific websites in each category may be presented for the unknown user's selection. The questionnaire presented to the unknown user may be dynamically created and personalized for the unknown user based on information provided by the unknown user. For example, if the unknown user has selected the news category of websites, he or she may be presented with a first list of popular news websites that are personalized for the unknown user based on the unknown user's geographic location as well as the other categories of websites that the unknown user identified as visiting. A second list of popular websites may be presented to the unknown user. Like the first list of popular websites, the second list of websites may be personalized for the unknown user based on information received from the unknown user, including the websites selected from the first list of websites.

The method 300 may include, at action 308, identifying, based on the second data, a matching cluster into which the unknown user fits. For example, a matching cluster may contain known individuals that visit the same website categories as the unknown user and that are from the same geographic location as the unknown user. Specific individual (s) within the matching cluster(s) may be identified that are the most similar to the unknown user. For example, a group of known users may be identified as most similar to the unknown user. This group may be small, containing only a few known users or large, containing several thousand known users. This group of known users may be ranked based on their similarity to the unknown user.

The method 300 may include, at action 310, estimating, based on the identified levels of online tracking for one or more known users within the matching cluster, a level of online tracking for the unknown user. For example, an average of the level of online tracking of the one or more known users that are most similar to the unknown user may be identified. This average level of online tracking may be used to estimate the level of online tracking for the unknown user. In another embodiment, the ranking of the one or more known users that are most similar to the unknown user may be used to weight the unknown user's level of online tracking. For example, the known users who are most similar to the unknown user may be weighted more heavily than the others to estimate the level of online tracking for the unknown user.

The estimated level of online tracking may include an estimated number of trackers following the unknown user and the identity of the entities that are likely tracking the unknown user. The estimated level of online tracking may also include a type of tracking activity that tracking entities are likely conducting on the unknown user. For example, the type of tracking activity may include a ghost creator, a third-party creator, an intermediate creator, an own sender, an in-chain sender, an off-chain sender, an own receiver, an own self-receiver, an in-chain receiver, an in-chain self-receiver, an off-chain receiver, an off-chain self-receiver, an intermediate sharer, or another type of tracking activity. A tracking score may also be assigned to each tracking entity based on the tracking techniques they use and the severity of the privacy violations they commit. These tracking scores for each tracking entity may also be included within the level of online tracking for the unknown user.

The method 300 may include, at action 312, performing a security action based on the estimated level of online tracking for the unknown user. This security action may include identifying to the unknown user the estimated level of online tracking and/or identifying a solution to reduce the estimated level of online tracking. The security action may also include recommending that the unknown user avoid certain websites, disable cookie tracking, or use a VPN to browse the Internet.

The method 300 may thus be employed, in some embodiments, to estimate a level of online tracking for a user without requiring the user to install software that makes the user's browser history accessible. Once the user's level of online tracking is estimated, security actions may be identified and performed to reduce the user's level of online tracking. Although the actions of the method 300 are illustrated in FIG. 3 as discrete actions, various actions may be divided into additional actions, combined into fewer actions, reordered, expanded, or eliminated, depending on the desired implementation.

Further, it is understood that the method 300 may improve the functioning of a computer system itself. For example, by performing a security action that increases a user's awareness of his or her online tracking levels and privacy violations by tracking entities, the user may acquire anti-tracking software and/or avoid websites that load content from tracking domains. By acquiring this software and/or avoiding these websites, the privacy violations that consume computing resources on the users' devices can be avoided.

Also, the method 300 may improve the technical field of online privacy awareness. By providing users with an estimation of a level of online tracking that is occurring without requiring the user to install any additional software, users can quickly appreciate the significance of their online tracking activity. Users can determine, based on their estimated level of online tracking, what security actions, if any, are necessary for protection.

FIG. 4 illustrates an example computer system that may be employed in protecting against an estimated level of online tracking. In some embodiments, the computer system 400 may be part of any of the systems or devices described in this disclosure. For example, the computer system 400 may be part of any of the user devices 104a-104n, 106, the tracker servers 108a-108n, and the security server 110 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the tracker applications 114a-114n, the security applications 122 and 200, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the tracker applications 114a-114n and the security applications 122 and 200.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting against an estimated level of online tracking, at least a portion of the method being performed by a computing device comprising one or more processors, the method comprising:
   collecting first data relating to a plurality of known users, wherein the plurality of known users is associated with a plurality of accessible user devices and wherein the first data includes an identification of one or more websites visited by each known user on the plurality of accessible user devices, and a level of online tracking for each known user on the plurality of accessible user devices;
   organizing the known users into clusters by identifying website categories from the one or more websites visited by the known users on the plurality of accessible user devices and placing the known users into clusters based on their most visited website categories;
   receiving second data relating to an unknown user, the second data including an identification of one or more categories of websites that the unknown user visits and one or more websites within each of the one or more categories of websites that the unknown user visits;
   identifying, based on the second data, a matching cluster into which the unknown user fits;
   estimating, based on the identified levels of online tracking for one or more known users within the matching cluster, a level of online tracking for the unknown user; and
   performing a security action based on the estimated level of online tracking for the unknown user.

2. The method of claim 1, wherein each cluster within the one or more clusters includes one or more graphs and trees, which are constructed based on the most accessed websites by the known users within each website category.

3. The method of claim 1, wherein the one or more categories of websites that the unknown user visits and the one or more websites within each of the one or more categories of websites that the unknown user visits are provided by the unknown user in response to a questionnaire that requests this information.

4. The method of claim 3, wherein the questionnaire provides a list of categories of websites and the unknown user is instructed to select the categories of websites that the unknown user most often visits.

5. The method of claim 4, wherein:
the questionnaire provides a first list of websites within a category selected by the unknown user, and
the unknown user is instructed to select the websites in the first list that the unknown user has visited within an identified period of time.

6. The method of claim 5, wherein:
the questionnaire provides a second list of websites within the category selected by the unknown user,
the second list of websites is personalized for the unknown user based on the websites selected from the first list of websites, and
the unknown user is instructed to select the websites in the second list that the unknown user has visited within an identified period of time.

7. The method of claim 1, wherein the estimated level of online tracking for the unknown user includes at least one of an estimated number of trackers following the unknown user, the identity of the trackers likely following the unknown user, or a type of tracking activity likely to be occurring.

8. The method of claim 1, wherein the security action includes identifying to the unknown user the estimated level of online tracking.

9. The method of claim 1, wherein the security action includes identifying a solution to reduce the estimated level of online tracking.

10. One or more non-transitory computer-readable media comprising one or more computer-readable instructions that, when executed by one or more processors of a computing device, cause the computing device to perform a method for protecting against an estimated level of online tracking, the method comprising:
collecting first data relating to a plurality of known users, wherein the plurality of known users is associated with a plurality of accessible user devices and wherein the first data includes an identification of one or more websites visited by each known user on the plurality of accessible user devices, and a level of online tracking for each known user on the plurality of accessible user devices;
organizing the known users into clusters by identifying website categories from the one or more websites visited by the known users on the plurality of accessible user devices and placing the known users into clusters based on their most visited website categories;
receiving second data relating to an unknown user, the second data including an identification of one or more categories of websites that the unknown user visits and one or more websites within each of the one or more categories of websites that the unknown user visits;
identifying, based on the second data, a matching cluster into which the unknown user fits;
estimating, based on the identified levels of online tracking for one or more known users within the matching cluster, a level of online tracking for the unknown user; and
performing a security action based on the estimated level of online tracking for the unknown user.

11. The one or more non-transitory computer-readable media of claim 10, wherein each cluster within the one or more clusters includes one or more graphs and trees, which are constructed based on the most accessed websites by the known users within each website category.

12. The one or more non-transitory computer-readable media of claim 10, wherein the one or more categories of websites that the unknown user visits and the one or more websites within each of the one or more categories of websites that the unknown user visits are provided by the unknown user in response to a questionnaire that provides a list of categories of websites and the unknown user is instructed to select the categories of websites that the unknown user most often visits.

13. The one or more non-transitory computer-readable media of claim 12, wherein:
the questionnaire provides a first list of websites within a category selected by the unknown user, and
the unknown user is instructed to select the websites in the first list that the unknown user has visited within an identified period of time.

14. The one or more non-transitory computer-readable media of claim 13, wherein:
the questionnaire provides a second list of websites within the category selected by the unknown user,
the second list of websites is personalized for the unknown user based on the websites selected from the first list of websites, and
the unknown user is instructed to select the websites in the second list that the unknown user has visited within an identified period of time.

15. The one or more non-transitory computer-readable media of claim 10, wherein the security action includes identifying to the unknown user the estimated level of online tracking or identifying a solution to reduce the estimated level of online tracking.

16. A computing device comprising:
one or more processors; and
one or more non-transitory computer-readable media comprising one or more computer-readable instructions that, when executed by the one or more processors, cause the computing device to perform a method for protecting against an estimated level of online tracking, the method comprising:
collecting first data relating to a plurality of known users, wherein the plurality of known users is associated with a plurality of accessible user devices and wherein the first data includes an identification of one or more websites visited by each known user on the plurality of accessible user devices, and a level of online tracking for each known user on the plurality of accessible user devices;
organizing the known users into clusters by identifying website categories from the one or more websites visited by the known users on the plurality of accessible user devices and placing the known users into clusters based on their most visited website categories;
receiving second data relating to an unknown user, the second data including an identification of one or more categories of websites that the unknown user visits and one or more websites within each of the one or more categories of websites that the unknown user visits;

identifying, based on the second data, a matching cluster into which the unknown user fits;

estimating, based on the identified levels of online tracking for one or more known users within the matching cluster, a level of online tracking for the unknown user; and performing a security action based on the estimated level of online tracking for the unknown user.

17. The computing device of claim 16, wherein the one or more categories of websites that the unknown user visits and the one or more websites within each of the one or more categories of websites that the unknown user visits are provided by the unknown user in response to a questionnaire that provides a list of categories of websites and the unknown user is instructed to select the categories of websites that the unknown user most often visits.

18. The computing device of claim 17, wherein:

the questionnaire provides a first list of websites within a category selected by the unknown user, and the unknown user is instructed to select the websites in the first list that the unknown user has visited within an identified period of time.

19. The computing device of claim 18, wherein:

the questionnaire provides a second list of websites within the category selected by the unknown user, the second list of websites is personalized for the unknown user based on the websites selected from the first list of websites, and the unknown user is instructed to select the websites in the second list that the unknown user has visited within an identified period of time.

20. The computing device of claim 16, wherein the security action includes identifying to the unknown user the estimated level of online tracking or identifying a solution to reduce the estimated level of online tracking.

\* \* \* \* \*